(12) United States Patent
Sugiura et al.

(10) Patent No.: US 7,468,933 B2
(45) Date of Patent: Dec. 23, 2008

(54) COLLISION DETECTION DEVICE

(75) Inventors: Makiko Sugiura, Hakinan (JP);
Takahiko Yoshida, Okazaki (JP); Inao Toyoda, Anjo (JP)

(73) Assignee: Denso Corproation, Kariya-city (JP)

( * ) Notice: Subject to any disclaimer, the term of this patent is extended or adjusted under 35 U.S.C. 154(b) by 116 days.

(21) Appl. No.: 11/724,167

(22) Filed: Mar. 15, 2007

(65) Prior Publication Data

US 2007/0237027 A1    Oct. 11, 2007

(30) Foreign Application Priority Data

Apr. 11, 2006 (JP) .............................. 2006-108779

(51) Int. Cl.
*G01S 15/93* (2006.01)
*G08G 1/16* (2006.01)
(52) U.S. Cl. .................... 367/96; 340/903; 340/436; 701/45
(58) Field of Classification Search .................. 367/96; 701/45, 301; 340/435, 436, 903, 943
See application file for complete search history.

(56) References Cited

U.S. PATENT DOCUMENTS 6,784,792 B2 *  8/2004  Mattes et al. ............... 340/436

2005/0182540 A1   8/2005  Sugiura et al.
2005/0231339 A1  10/2005  Kudo

FOREIGN PATENT DOCUMENTS

| DE | 101 44 689 A1 | 3/2003 |
| JP | A-63-185800 | 8/1988 |
| JP | A-11-28994 | 2/1999 |

OTHER PUBLICATIONS

Office Action dated Mar. 10, 2008 in corresponding German Patent Application No. 10 2007 016 561.9 (and English translation).

* cited by examiner

*Primary Examiner*—Ian J Lobo
(74) *Attorney, Agent, or Firm*—Posz Law Group, PLC (57) ABSTRACT

A collision detection device for a vehicle includes a first direction signal outputting unit which detects an intensity of heat ray radiated from a detection object which is near or contacts the vehicle to outputs a first direction signal, a second direction signal outputting unit which detects ultrasound wave sent by a sending member and reflected by the detection object to output a second direction signal, an impact signal outputting unit which detects an impact on the vehicle to output an impact signal, and a control unit. The control unit determines an occurrence of a collision between the vehicle and a human, in the case where it is determined that a difference between the first direction signal and the second direction signal is within a first predetermined range and the impact signal is outputted.

13 Claims, 8 Drawing Sheets

COLLISION DETECTION DEVICE

CROSS REFERENCE TO RELATED APPLICATION

This application is based on a Japanese Patent Application No. 2006-108779 filed on Apr. 11, 2006, the disclosure of which is incorporated herein by reference.

FIELD OF THE INVENTION

The present invention relates to a collision detection device.

BACKGROUND OF THE INVENTION

Generally, for example, with reference to JP-11-28994A, a collision detection device is mounted to a vehicle to detect a collision between the vehicle and a human. In this case, the collision with the human is determined based on a signal waveform outputted from a load sensor or a displacement sensor arranged in a front bumper of the vehicle and a signal waveform outputted from a vehicle velocity sensor. That is, the collision with the human is determined, based on that the signal waveform of the load sensor or the like recovers earlier in the case of the collision between the vehicle and a human than in the case of the collision between the vehicle and a fixed object such as other vehicle, a wall, a tree, and a utility pole.

However, according to JP-11-28994A, in the case where the output waveform of the load sensor or the like is not within a predetermined range, it will be determined that there occurs a collision between the vehicle and the fixed object even when the collision obstacle is the human. That is, it is difficult to detect the collision with the human. Moreover, in the case where the output waveform of the load sensor is within the predetermined range, it will be falsely determined that there occurs the collision between the vehicle and the human when the obstacle is the fixed object having a similar property (e.g., mass or stiffness) to the human.

As disclosed in JP-2005-201658A by the applicant of the present invention, a collision detection device is provided to determine whether or not the collision obstacle is a human by a detection of the temperature of the collision object (which is near or contacts the vehicle) by a temperature detection unit.

Thus, a collision signal will be outputted in the case where it is determined the collision obstacle is the human based on the temperature signal and it is determined that an impact signal is outputted. Therefore, even when there occurs the collision between the vehicle and the fixed object having the similar property (e.g., mass or stiffness) to the human, it will not be determined that the collision obstacle is the human because the determining is performed based on the temperature signal. Thus, the false determining can be restricted.

However, in this case, it is difficult for the temperature detection unit to detect the fixed object which is not a heat source. Therefore, in the case where the vehicle collides with an obstacle (which is nearer to vehicle than detection object of temperature detection unit) other than human being, it will be falsely determined that there occurs a collision between the vehicle and the human in the state where the temperature signal from the temperature detection unit indicates that the detection object is the human.

SUMMARY OF THE INVENTION

In view of the above-described disadvantage, it is an object of the present invention to provide a collision detection device to substantially distinguish a collision with a human from a collision with an obstacle other than the human and restrict a false detection.

According to the present invention, a collision detection device for a vehicle includes a first direction signal outputting unit for detecting an intensity of heat ray radiated from a detection object which is near or contacts the vehicle and for outputting a first direction signal which indicates an existence direction of the detection object based on the detected intensity, a sending member which is mounted to the vehicle to send ultrasonic wave, a second direction signal outputting unit for detecting ultrasound wave which is sent by the sending member and reflected by the detection object and for outputting a second direction signal which indicates the existence direction of the detection object based on a detection result about the ultrasonic wave, an impact signal outputting unit for detecting an impact on the vehicle and for outputting an impact signal which indicates that the impact is applied to the vehicle based on a detecting result about the impact, and a control unit. The control unit determines an occurrence of a collision between the vehicle and a human, in the case where the control unit determines that a difference between the first direction signal and the second direction signal is within a first predetermined range and the impact signal is outputted.

Thus, in the case where the control unit determines that the difference between the first direction signal and the second direction signal is within the first predetermined range, the detection object is a heat source and tangible so that it can be determined that the detection object is the human. In the case where only the first direction signal is outputted, it can be determined that the detection object is the heat source which is intangible. In the case where only the second direction signal is outputted, it can be determined that the detection object does not radiate the heat ray. Thus, the human can be substantially distinguished from other obstacle.

Preferably, the impact signal outputting unit further outputs a third direction signal indicating a direction of the impact applied to the vehicle based on the detecting result about the impact on the vehicle. The control unit determines that there occurs the collision between the vehicle and the human, in the case where the control unit determines that a difference between the third direction signal and the first direction signal is within a second predetermined range and a difference between the third direction signal and the second direction signal is within a third predetermined range.

That is, the collision signal is outputted in the case where the existence direction of the detection object and the direction in which the impact is applied to the vehicle are substantially same. Therefore, the collision signal is not outputted in the case where the impact is applied to the vehicle in a different direction from the existence direction of the detection object, that is, for example, in the case where the approaching direction of the human is different from the direction in which the impact from a fixed object such as a power pole is applied.

Therefore, the false detection can be restricted in the case where the impact is applied to the vehicle by the fixed object and the human simultaneously approaches the vehicle in a different direction from the impact direction.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE EXAMPLED EMBODIMENTS

First Embodiment

A collision detection device 1 according to a first embodiment of the present invention will be described with reference to FIG. 1A-FIG. 6. The collision detection device 1 can be suitably mounted to a vehicle 80 to detect a collision of the vehicle and sort-distinguish a collision obstacle.

Figure 1A:
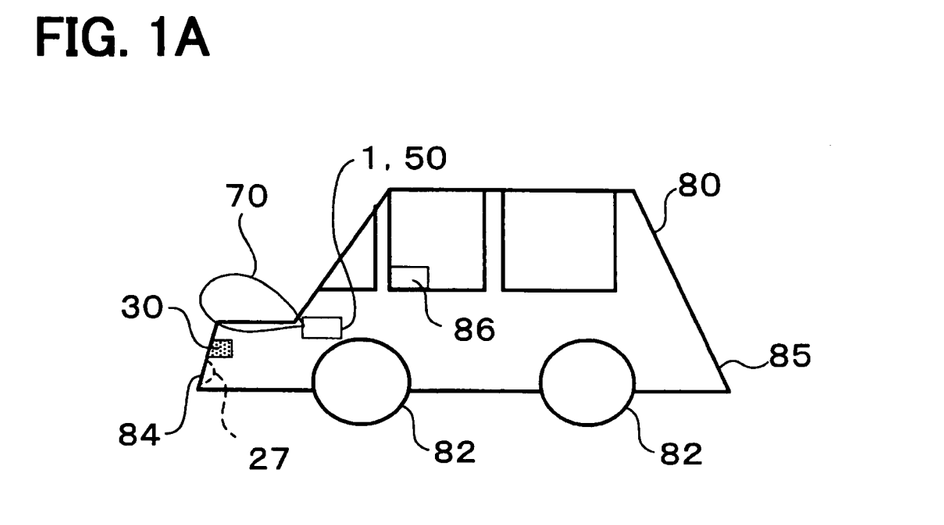
FIG. 1A is a schematic side view showing a collision detection device when being mounted to a vehicle according to a first embodiment of the present invention.
Figure 1B:
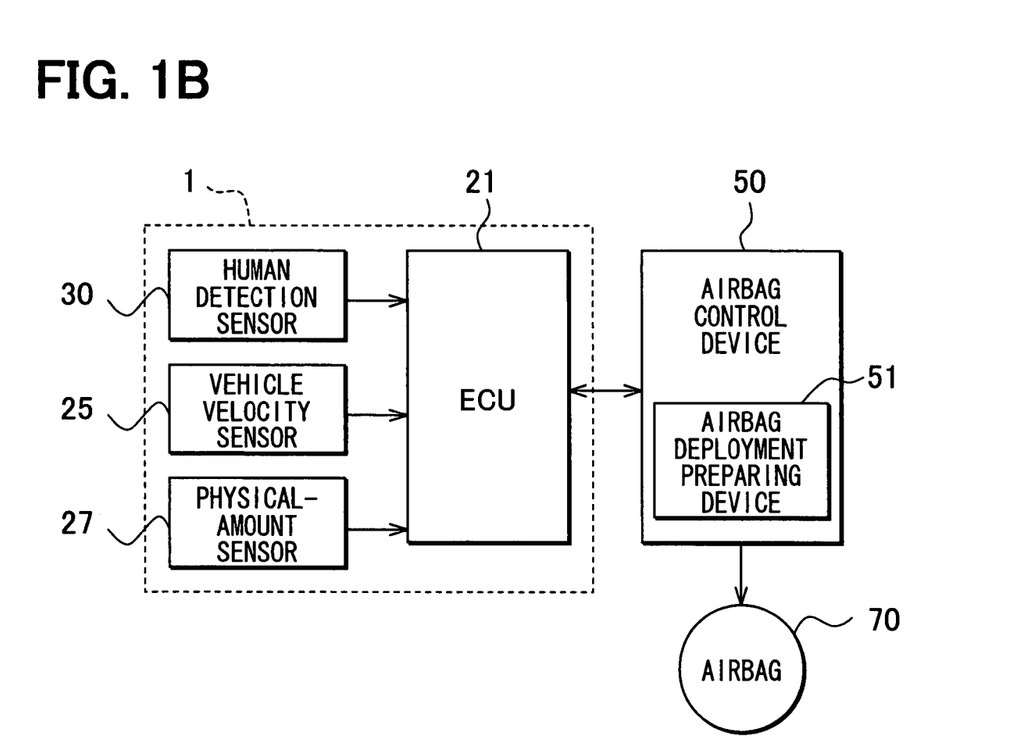
FIG. 1B is a block diagram showing an electrical construction of the collision detection device and a connection relation with an airbag system according to the first embodiment.

For example, the collision detection device 1 can be suitably used for an airbag system of the vehicle 80. As shown in FIGS. 1A and 1B, the airbag system can include the collision detection device 1, an airbag control device 50 and an airbag 70 and the like. In the case where there occurs a collision between the vehicle and a human, the airbag 70 will be deployed at the inner side of an engine hood of the vehicle or at the outer side of the engine hood so that an impact on the human can be reduced.

Specifically, the collision detection device 1 will output a collision signal to the airbag control device 50 when the collision between the vehicle and the human is detected. Thus, the airbag control device 50 activates the airbag 70 or/and a lifting device for lifting the engine hood or the like for protecting the human colliding with the vehicle. Accordingly, the airbag 70 can be deployed at the inner side or the outer side of the engine hood which is lifted, so that the impact on the human can be buffered.

Furthermore, the airbag control device 50 can have an airbag deploy preparing device 51 for preparing for the deployment of the airbag 70. The airbag deploy preparing device 51 outputs a deployment preparing signal for preparing for the deployment of the airbag 70, for example, for preparing for an ignition of a gas generation device or preparing compressed air to deploy the airbag 70 and the like.

As shown in FIG. 1B, the collision detection device 1 has at least one human detecting sensor 30 which includes an infrared detection portion and an ultrasonic detection portion, at least one physical-amount sensor 27 (impact signal outputting unit) and an ECU 21 (electronic control unit).

The human detecting sensor 30 corresponds to a first direction signal outputting unit and a second direction signal outputting unit. The ECU 21 corresponds to a control unit (collision signal outputting unit).

The infrared detection portion of the human detecting sensor 30 detects the intensity of heat ray radiated from a detection object (obstacle) such as a human which is near or contacts the vehicle 80, and outputs a first direction signal which indicates the existence direction of the detection object based on the detected intensity.

Figure 3A:
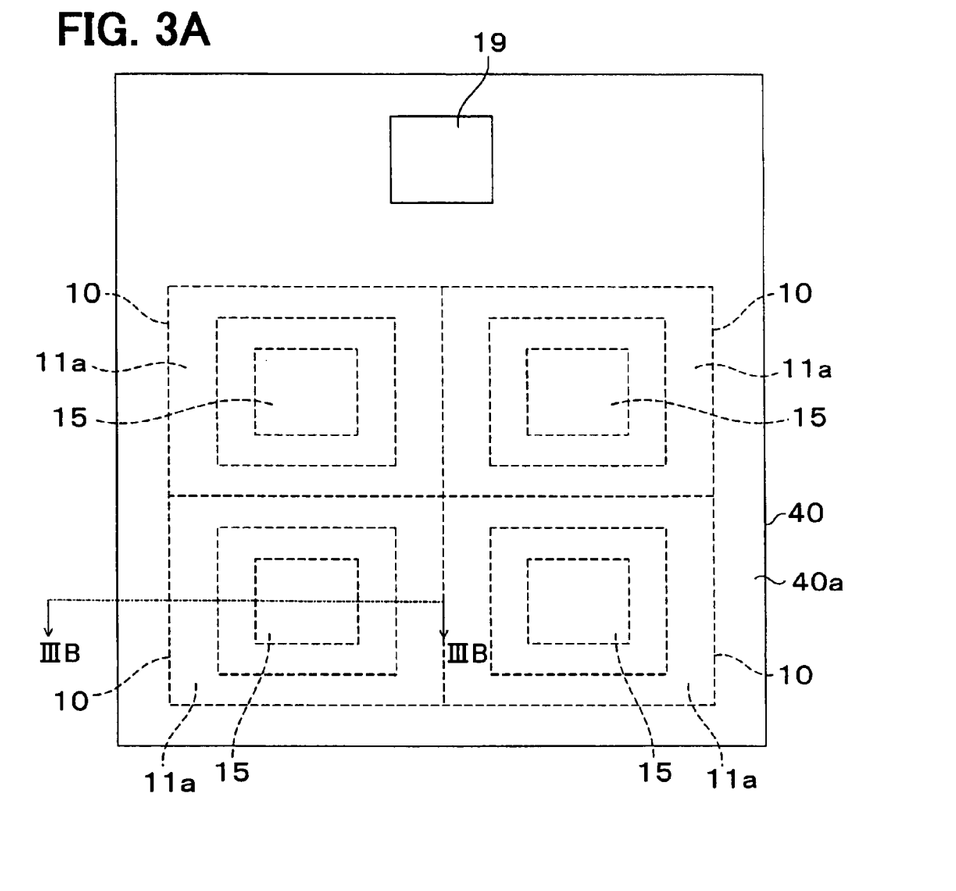
FIG. 3A is a schematic plan view showing the human detection sensor when being viewed from the exterior of the vehicle according to the first embodiment.

The human detecting sensor 30 has a sending member 19 (as shown in FIG. 3A) for sending ultrasound wave. The ultrasonic detection portion of the human detecting sensor 30 detects the ultrasonic wave which is sent by the sending member 19 and reflected by the detection object, and outputs a second direction signal which indicates the existence direction of the detection object based on the detection result about the ultrasonic wave.

The physical-amount sensor 27 detects an impact applied to the vehicle, and outputs an impact signal which indicates that the impact is exerted to the vehicle based on the detection result.

The ECU 21 determines whether or not a difference between the first direction signal and the second direction signal is within a first predetermined range, and outputs a collision signal indicating that there occurs a collision between the vehicle and the detection object in the case where the impact signal is outputted.

The ECU 21 can be constructed of, for example, a microcomputer of an ASIC (application specified integrate circuit) type which includes a CPU (central processing unit), a RAM (random access memory), a ROM (read only memory), an I/O (input/output interface), an interface (not shown) and the like. The CPU can be connected with a vehicle velocity sensor 25 (velocity outputting unit), the physical-amount sensor 27, the human detecting sensor 30 through the I/O or the like, and can be connected with the airbag control device 50 through a communication interface or the like.

Figure 2A:
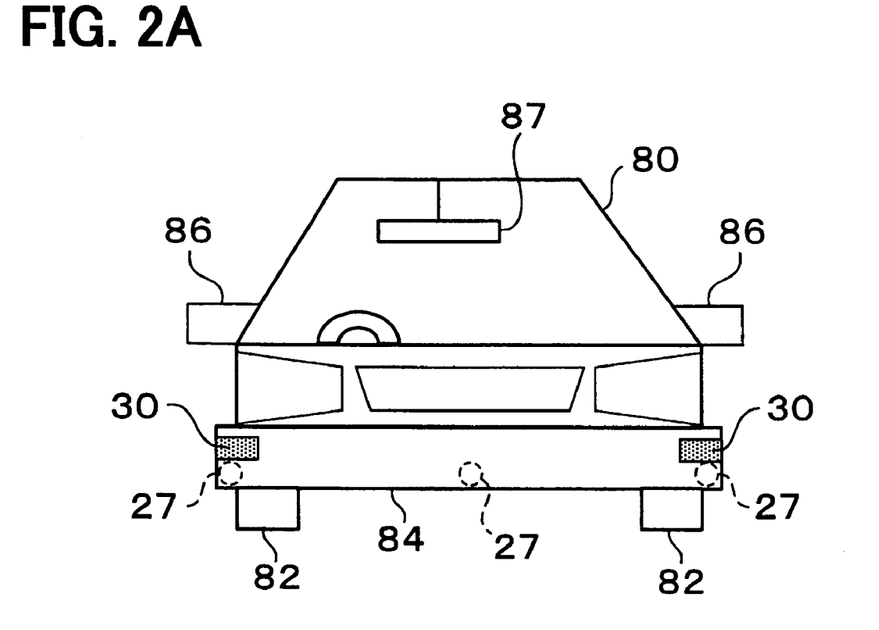
FIG. 2A is a schematic view showing a human detection sensor when being mounted to a front bumper of the vehicle according to the first embodiment.
Figure 2B:
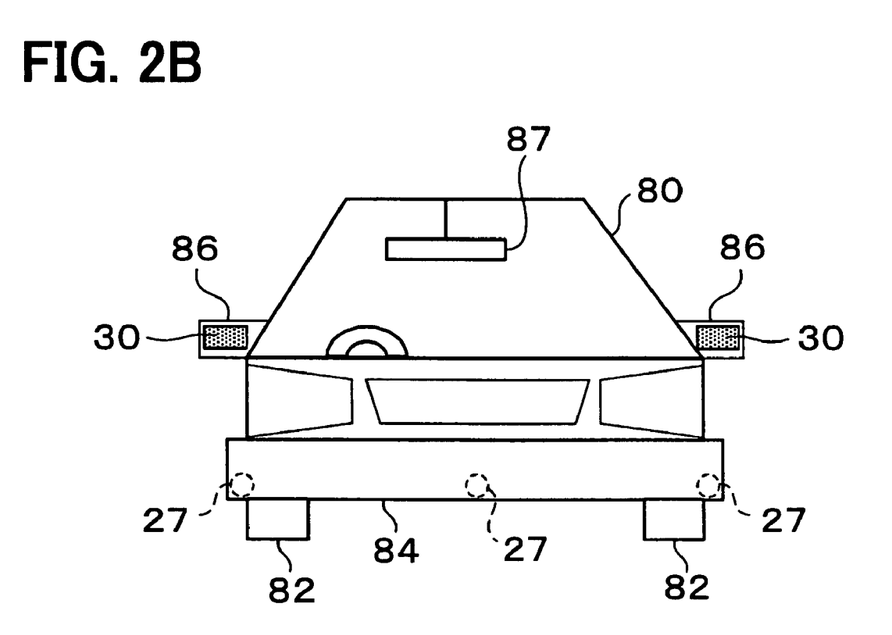
FIG. 2B is a schematic view showing the human detection sensor when being mounted to a back side of a door mirror of the vehicle according to the first embodiment.

In this case, the two human detection sensors 30 can be provided. For example, as shown in FIG. 2A, the two human detection sensors 30 can be respectively arranged at the right side and the left side of the front bumper 84 with respect to the width direction of the vehicle 80. Alternatively, as shown in FIG. 2B, the two human detection sensors 30 can be also respectively arranged at the back sides (not being the mirror surface sides) of door mirrors 86 of the vehicle 80. In these cases shown in FIGS. 2A and 2B, the human detecting sensor 30 can be arranged in such a state that a receiving portion 40*a* (shown in FIG. 3B) of the human detection sensors 30 is exposed to the side of the detection object.

Figure 3B:
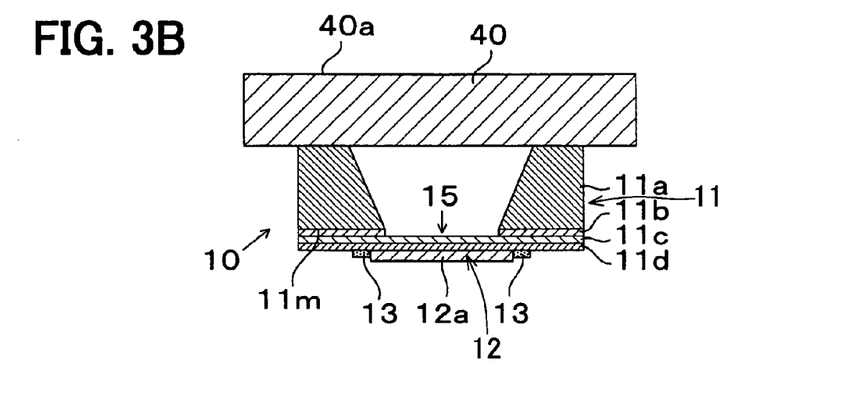
FIG. 3B is a schematic sectional view taken along a line IIIB-IIIB in FIG. 3A.

As shown in FIGS. 3A and 3B, the human detecting sensor 30 has at least one detection unit 10 for detecting a human, a sending member 19 for sending ultrasonic wave, and a receiving member 40 which includes the receiving portion 40*a* for receiving the ultrasonic wave reflected by the detection object. The detection unit 10 is mounted to the vehicle 80 through the receiving member 40, and protected by the receiving member 40.

The receiving member 40 can have a rectangle-like flat plate shape. In this case, the multiple (e.g., four) detection units 10 can be provided. The four detection units 10 are mounted to the receiving member 40 and positioned at the inner side of the vehicle. The detection units 10 can be arranged in such a manner that the four detection units 10 are arrayed at two rows in a length-to-width direction of the receiving member 40. In this case, each of the two rows can be provided with the two detection units 10, for example.

In this case, the receiving member 40 can function as a transferring media for transferring the ultrasonic wave to the detection unit 10. Moreover, the infrared can pass through the receiving member 40. It is desirable that the receiving member 40 is made of a sturdy material (such as glass and silicon) through which the infrared can pass.

Each of the detection units 10 has a detection member 15. The detection units 10 are arranged in such a manner that a distance between centers of the detection portions 15 of the two detection units 10 adjacent to each other is substantially equal to an integral multiple of a one-half wavelength of the ultrasonic wave.

The sending member 19 is arranged to be adjacent to the human detecting sensor 30, and mounted in such a manner that the sending surface of the ultrasonic wave thereof is exposed to the outer side of the vehicle 80.

As shown in FIG. 3B, the detection unit 10 has a semiconductor board 11 which can have a substantial rectangle shape and have a SOI (silicon on insulator) structure. The semiconductor board 11 is made of a material through which the infrared can pass.

The semiconductor board 11 includes a supporting member 11*a* (made of silicon, for example), a first insulation film 11*b*, a silicon activated layer 11*c* and a second insulation film 11*d*. The first insulation film 11*b*, the silicon activated layer 11*c* and the second isolation film 11*d* are sequentially stacked at an upper surface 11*m* of the supporting member 11*a*. That is, the first insulation film 11*b* is arranged to contact the upper surface 11*m*, and the silicon activated layer 11*c* is positioned between the first insulation film 11*b* and the second insulation film 11*d*.

Each of the center portions of the supporting member 11*a* and the first insulation film 11*b* is eliminated by a MEMS technology or the like to have an opening, for example. Thus, the supporting member 11*a* is constructed to have a flat plate shape in such a manner that the center portion thereof is hollowed to have the substantially rectangle-shaped opening, for example. In this case, the silicon activated layer 11*c* and the second insulation film 11*d* which are not hollowed are constructed to have the substantially rectangle-like film shape, for example.

Alternatively, the semiconductor board 11 can be also provided with a silicon board at which the first insulation film 11*b* is film-formed. In this case, the silicon activated layer 11*c* can be constructed of a polysilicon which is film-formed at the first insulation film 11*b* and into which ion is injected. Moreover, the second insulation film 11*d* is film-formed at the silicon activated layer 11*c*. Thus, the semiconductor board 11 is constructed According to this embodiment, a vibration detection portion 12 (e.g., of piezoelectric type having pyroelectric property) which has a film shape is arranged at the second insulation film 11*d*. The vibration detection portion 12 can have a piezoelectric film 12*a* which is made of, for example, PZT (lead zirconium titanate), and electrically connected with electrodes 13.

Thus, the detection member 15 which has the end portion lifted by the supporting member 11*a* is constructed. The detection member 15 having a predetermined resonance frequency receives the ultrasonic wave which is reflected by the detection object and transferred to the detection unit 10, to resonate. Thus, the displacement of the detection member 15 which is caused due to the vibration (resonance) is converted to a voltage signal by the vibration detection portion 12, so that the ultrasonic wave is detected. That is, the vibration detection portion 12 functions as an ultrasonic-wave detecting member.

In this case, the detection unit 10 (made by the MEMS technology, for example) has the resonance frequency which is sharp to have a high sensitivity for receiving the ultrasonic wave. Thus, the detection accuracy of the direction signal can be improved.

Moreover, because the vibration detection portion 12 has the pyroelectric property, the intensity of the heat ray radiated by the detection object such as the human can be detected by the vibration detection portion 12. That is, the piezoelectric type vibration detection portion 12 also functions as an infrared detecting member.

The supporting member 11*a* of the detection unit 10 is mounted to the surface of the receiving member 40 of the inner side of the vehicle 80. That is, the detection unit 10 is attached to the receiving member 40 via the supporting member 11*a* at a position which is invisible from the outer side of the vehicle 80, in such a manner that the detection member 15 non-contacts the receiving member 40. Thus, the detection unit 10 can be protected from an exterior load and a coming-flying of foreign matter and the like.

Alternatively, the receiving member 40 can be also attached to the front bumper 84 or the door mirror 86 of the vehicle 80, and made of a material similar with that of the front bumper 84 or of the door mirror 86 to be unobvious when being viewed from the exterior.

However, the number of the detection units 10 is not limited to four, and the arrangement of the detection units 10 is not limited to that the every two detection unit 10 are positioned in the length-to-width direction. More alternatively, a chip where the multiple detection units 10 are integrated can be also used.

The vehicle velocity sensor 25 is arranged to be adjacent to a wheel 82 of the vehicle, to detect the rotation velocity of the wheel 82 and output the rotation velocity as a vehicle velocity signal to the ECU 21. The ECU 21 determines whether or not the wheel 82 of the vehicle is rotating based on the vehicle velocity signal inputted from the vehicle velocity sensor 25, thus determining whether or not the vehicle is traveling.

The physical-amount sensor 27 can be constructed of an acceleration sensor, or a displacement sensor, or a pressure sensor or the like, to detect the impact applied to the vehicle 80 as a physical amount (such as acceleration, displacement and pressure) based on the detection result and output (to ECU 21) an impact signal showing that the impact is exerted on the vehicle 80.

The physical-amount sensor 27 can be arranged in the front bumper 84 of the vehicle. For example, as shown in FIGS. 2A and 2B, the multiple physical-amount sensors 27 can be embedded in the front bumper 84, and respectively arranged at the right side, the substantial middle side and the left side of the vehicle.

Thus, the impact force which is applied to the vehicle by the detection object can be detected by the physical-amount sensors 27, in the case where there occurs a collision between the detection object such as the human and the front facade, the front right side or the left side of the vehicle 80.

Moreover, according to this embodiment, in the case where the multiple physical-amount sensors 27 are embedded in the front bumper 84, a calculation process can be performed to analyze an amplitude, an output timing, an output period, a delay time and the like of the impact signals of the multiple physical-amount sensors 27. Thus, a third direction signal for indicating the direction in which the impact force is applied can be outputted.

In this embodiment, the ECU 21 is constructed separately from the airbag control device 50. However, the function of the ECU 21 can be also realized by the airbag control device 50. Thus, the number of the components can be reduced.

Moreover, the sending member 19 can be also constructed separately from the human detecting sensor 30. Thus, the sending member 19 provided with the ultrasonic wave having a high sound pressure can be used, so that the signal intensity of the ultrasonic wave which is reflected by the detection object can be heightened.

Next, the detection of the ultrasonic wave and the infrared will be described.

Figure 4A:
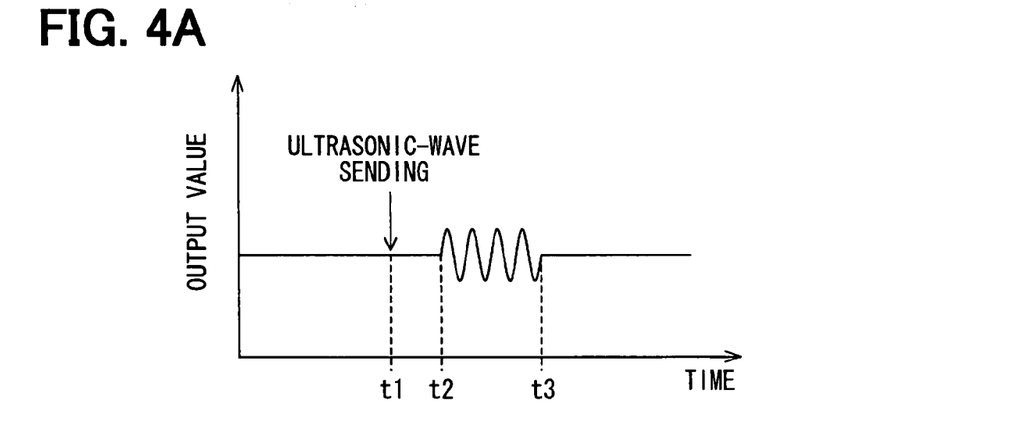
FIG. 4A is a graph showing a variation of an output value of the human detection sensor when detecting ultrasonic wave according to the first embodiment.
Figure 4B:
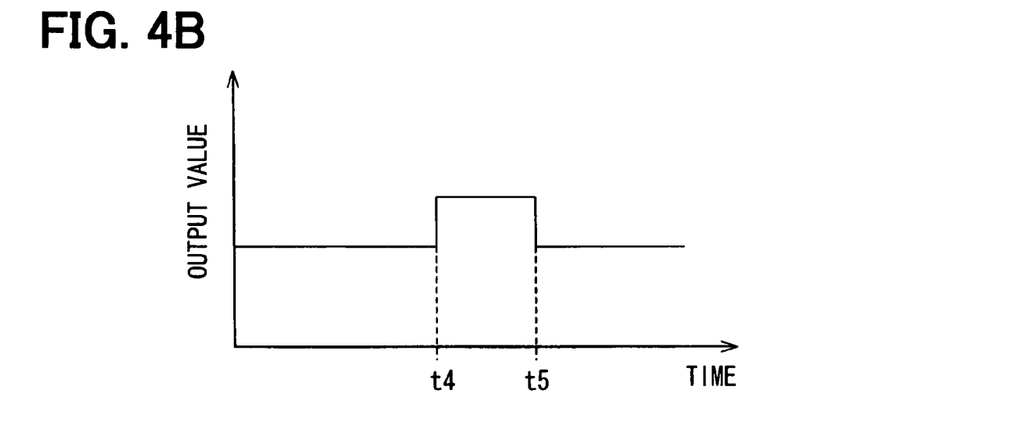
FIG. 4B is a graph showing a variation of an output value of the human detection sensor when detecting infrared according to the first embodiment.

FIGS. 4A and 4B respectively show variations over time of output values of the detection unit 10 in the cases where the ultrasonic wave and the infrared are detected. With reference to FIG. 4A, the ultrasonic wave which is sent by the sending member 19 at the time t1 and reflected by the detection object is received by the receiving portion 40a of the receiving member 40, and transferred toward the detection unit 10 in the thickness direction of the receiving member 40 as shown in FIG. 3B.

Next, the ultrasonic wave transferred through the receiving member 40 is transferred through the supporting member 11a as the vibration (compressional wave) in the solid, and vibration-excites the detection member 15 between the time t2 and the time t3. Thus, due to the vibration of the detection member 15, the voltage signal which varies with a wave shape is outputted from the vibration detection portion 12 to the ECU 21 between the t2 and the t3 as shown in FIG. 4A. Thus, the ultrasonic wave is detected. In this case, the distance between the vehicle 80 and the detection object can be calculated based on the time difference t2-t1.

In this case, the collision detection device 1 is provided with the multiple detection units 10. The time difference, and the phrase difference of the ultrasonic wave signals received by the detection units 10 can be calculated. Based on the differences, the existence direction of the detection object can be calculated, and the second direction signal indicating the existence direction of the detection object can be outputted.

According to this embodiment, the distance between the center portions of the detection portions 15 of the two detection units 10 adjacent to each other is substantially equal to the integral multiple of the one-half wavelength of the ultrasonic wave. Thus, the time difference can be detected from the phrase difference of the received ultrasonic wave. Therefore, the time difference of the received ultrasonic wave can be detected with an improved accuracy.

In this case, the infrared radiated by the detection object passes through the receiving member 40 and the semiconductor board 11, to reach the vibration detection portion 12. Thus, as shown in FIG. 4B, the output value of the voltage signal increases between the time t4 and the time t5 due to the pyroelectric property of the vibration detection portion 12. Therefore, the infrared can be detected.

In this case, the collision detection device 1 is provided with the multiple detection units 10 which detect the intensity of the received infrared. Based on the distribution of the detected intensity, the first direction signal indicating the existence direction of the detection object can be outputted.

Based on the detection results of the ultrasonic wave and the infrared of the multiple detection units 10, it can be determined whether or not the collision obstacle (detection object) is a human.

Figure 5:
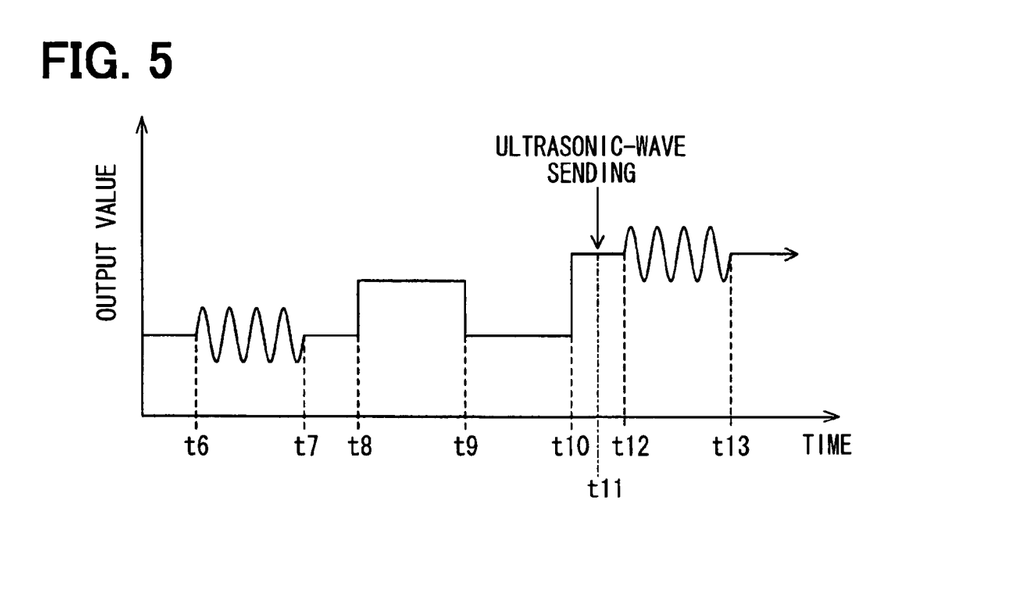
FIG. 5 is a graph showing a variation of an output value of the human detection sensor in the case where the human detection sensor detects a human according to the first embodiment.

As shown in FIG. 5, the detection unit 10 of the human detection sensors 30 outputs the voltage signal of the output value which varies with a wave shape between the time t6 and the time t7. In this case, the detection object is detected by the ultrasonic wave, but not detected by the infrared. Therefore, it is considered that the detection object is a tangible object without heat amount, for example, a power pole. Thus, it can be determined that the detection object is not the human.

As shown in FIG. 5, the output value of the detection unit 10 increases with a substantial rectangle shape between the time t8 and the time t9. In this case, the detection object is detected by the infrared, but not detected by the ultrasonic wave. It is considered that the detection object is an intangible object having heat amount, for example, a heat source such as exhaust gas from a duct. Thus, it can be determined that the detection object is not the human.

After the time t10, at first, the output value of the detection unit 10 increases with a substantial rectangle shape. At the time t11, the ultrasonic wave is sent from the sending member 19. The ultrasonic wave reflected by the detection object is detected at the time t12. Between the time t12 and the time t13, the voltage signal with the wave shape and the voltage signal with the rectangle shape are piggybacked onto each other to be detected.

In the case where the existence direction of the detection object detected by the ultrasonic wave and that detected by the infrared are substantially same to each other by comparing the first direction signal and the second direction signal, it is considered that the detection object is a tangible object having heat amount. That is, it can be determined that the detection object is the human.

Moreover, the detection unit 10 can detect the intensity of the heat ray to measure the temperature of the detection object based on the detected intensity. Generally, because the body temperature of the human is substantial 36° C., it is determined that the detection object is the human in the case where the temperature of the detection object is in a predetermined range, for example, from 32° C. to 43° C. On the other hand, it is determined that the detection object is the fixed object other than the human in the case where the temperature of the detection object is outside the predetermined range.

Next, the collision detection process exerted by the ECU 21 or the like will be described with reference to FIG. 6.

In this case, for example, a detection program memorized in the ECU 21 can be repeatedly executed by the ECU 21 every a predetermined period (e.g., 5 ms) by a timer interrupt or the like, so that the collision detection process is processed.

Figure 6:
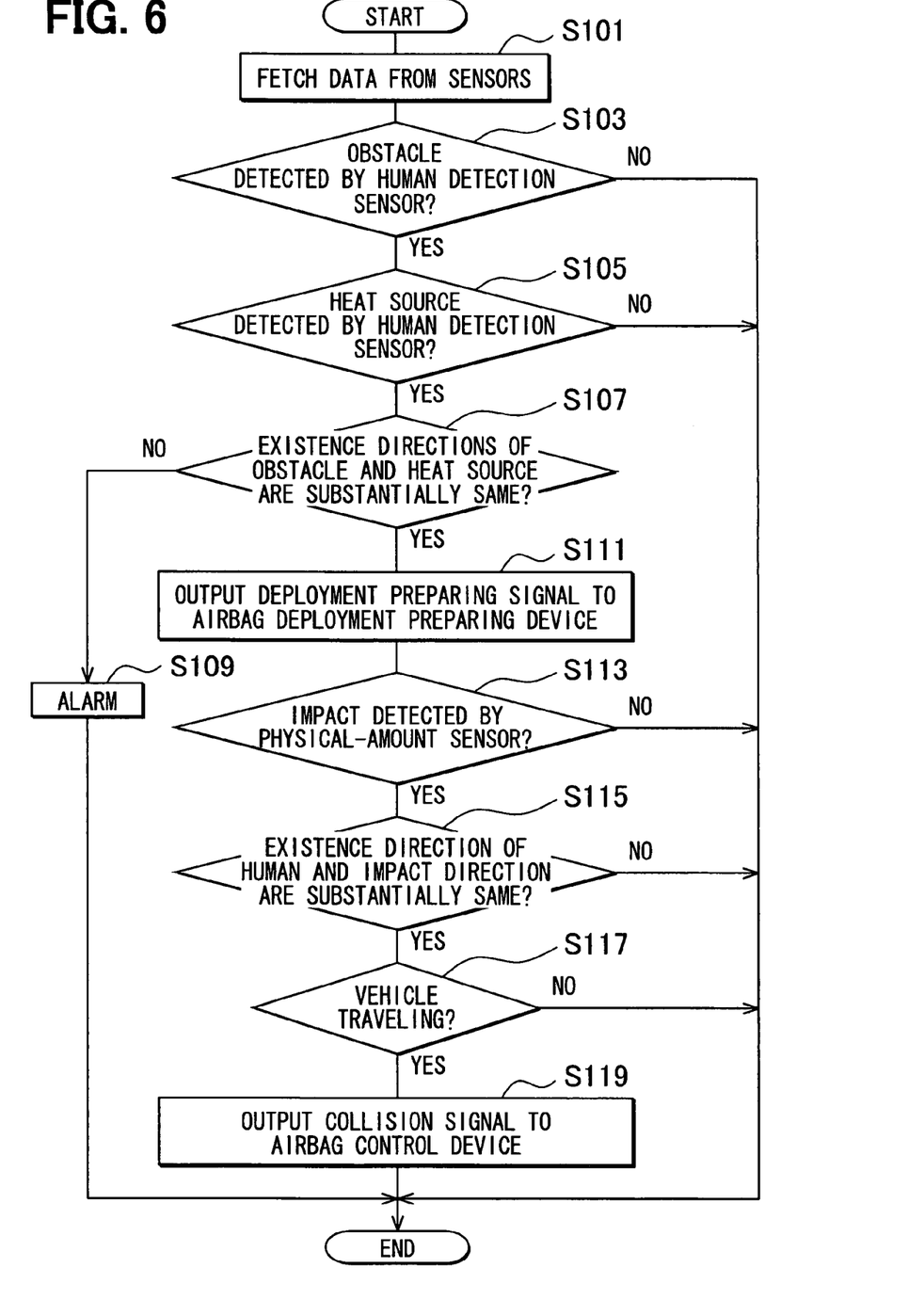
FIG. 6 is a flow chart showing a collision detection process executed by an ECU of the collision detection device according to the first embodiment.

According to the collision detection process shown in FIG. 6, after an initialization process, step S101 is performed to fetch kinds of the sensor data. Specifically, the first direction signal and the second direction signal from the human detecting sensor 30, the third direction signal from the physical-amount sensor 27, and the vehicle velocity signal from the vehicle velocity sensor 25 are respectively inputted to the ECU 21.

Then, at step S103, it is determined whether or not an obstacle is detected by the ultrasonic wave by the human detecting sensor 30. That is, it is determined whether or not the obstacle exists based on the second direction signal (from human detecting sensor 30) fetched at the step S101.

In the case where it is determined that there exists the obstacle (that is, YES is determined at step S103), step S105 will be performed. On the other hand, in the case where it is not determined that there exists the obstacle (that is, No is determined at step S103), it is unnecessary to deploy the airbag 70. Thus, the process shown in FIG. 6 is finished.

At step S105, it is determined whether or not a heat source radiating heat ray is detected by the infrared of the human detecting sensor 30. That is, it is determined whether or not there is the heat source based on the first direction signal (from human detecting sensor 30) fetched at the step S101.

Thus, in the case where it is determined that there is the heat source (that is, YES is determined at step S105), step S107 will be performed. On the other hand, in the case where it is not determined that there is the heat source (that is, NO is determined at step S105), the possibility that the detection object is not the human is high so that it is unnecessary to deploy the airbag 70. Thus, the process shown in FIG. 6 is ended.

Alternatively, at step S105, in addition to the above-described determining, it can be also determined whether or not the temperature of the heat source is within a predetermined range. That is, a temperature signal indicating the temperature of the heat source is also fetched from the human detecting sensor 30 at step S101. Based on the fetched temperature signal, it is determined whether or not the temperature of the heat source is within the predetermined range.

In the case where it is determined that the temperature of the heat source is within the predetermined range, the possibility that the heat source is the human is high. Thus, step S107 will be performed. On the other hand, in the case where it is not determined that the temperature of the heat source is within the predetermined range, the possibility that the heat source is not the human is high. Thus, it is unnecessary to deploy the airbag 70. Then, the process shown in FIG. 6 is finished.

At step S107, it is determined whether or not the existence direction of the obstacle and that of the heat source are substantially same. That is, the first direction signal and the second direction signal fetched from the human detecting sensor 30 at the step S101 are compared with each other, and it is determined whether or not the difference therebetween is within a first predetermined range.

The first direction signal and the second direction signal can be obtained as the angle signal with respect to the traveling direction of the vehicle 80. Therefore, for example, in the case where the difference between the first direction signal and the second direction signal is smaller to or equal to 5°, it is determined that the first direction signal and the second direction signal are substantially equal to each other. Thus, it can be determined that the existence direction of the obstacle and that of the heat source are substantially same.

Then, in the case where it is determined that the existence direction of the obstacle and that of the heat source are substantially same (that is, YES is determined at step S107), step S111 will be performed.

On the other hand, in the case where it is not determined that the existence direction of the obstacle and that of the heat source are substantially same (that is, NO is determined at step S107), it can be determined that the obstacle is not the human because the heat source and the obstacle respectively exist at the different directions. Therefore, it is unnecessary to deploy the airbag 70. Then, at step S109, an alarm is performed to inform the existence of the obstacle. Thereafter, the collision detection process shown in FIG. 6 is ended.

At step S111, a process is performed to output a deployment preparing signal to the airbag deploy preparing device 51 so that the deployment of the airbag is prepared by the airbag deploy preparing device 51.

That is, in the case where it is determined at step S107 that there exits the human in the traveling direction of the vehicle 80, the deployment of the airbag 70 is prepared (e.g., ignition of gas generation device is prepared) by the output of the deployment preparing signal from the ECU 21 to the airbag deploy preparing device 51. Then, step S113 will be performed.

At step S113, it is determined whether or not the physical-amount sensor 27 detects an impact on the vehicle 80. That is, based on whether or no there is the impact signal fetched at step S101, it is determined whether or not the detection object collides with the vehicle 80.

In the case where it is determined that the detection object collides with the vehicle (that is, YES is determined at step S113), step S115 will be performed. On the other hand, in the case where it is not determined that the detection object collides with the vehicle (that is, NO is determined at step S113), the collision detection process shown in FIG. 6 is ended.

At step S115, it is determined whether or not the existence direction of the human and the impact direction are substantially same. That is, the third direction signal fetched from the physical-amount sensor 27 at step S101 is respectively compared with the first direction signal and the second direction signal which are fetched from the human detection sensor 30 at step S101, and it determined whether or not the differences therebetween are respectively within a second predetermined range and a third predetermined range.

For example, in the case where it is determined that the difference between the third direction signal and the first direction signal is small than or equal to 5° and the difference between the third direction signal and the second direction signal is small than or equal to 5°, it is determined that the existence direction of the human and the impact direction are substantially same. That is, YES is determined at step S115. Thus, step S117 will be performed.

On the other hand, in the case where it is not determined that the existence direction of the human and the impact direction are substantially same, NO is determined at step S115. That is, for example, an approaching direction (e.g., front right side of vehicle 80) of the human is different from the direction (e.g., front left side of vehicle 80) of an impact from the tree or the like on the vehicle 80. In this case, it can be determined that the human which is near or contacts the vehicle is not directly related to the impact detected by the physical-amount sensor 27 and the human does not collide with the vehicle. Thus, it is unnecessary to deploy the airbag 70. Therefore, the collision detection process shown in FIG. 6 is ended.

Next, at step S117, it is determined whether or not the vehicle is traveling based on the vehicle velocity signal fetched at step S101.

In the case where it is determined that the vehicle is traveling (that is, YES is determined at step S117), step S119 will be performed. At step S119, a collision signal indicating that there occurs the collision between the vehicle 80 and the human is outputted to the airbag control device 50, to protect the human.

On the other hand, in the case where it is not determined that the vehicle is traveling (that is, NO is determined at step S117), the collision detection process shown in FIG. 6 will be ended.

At step S119, the collision signal is outputted to the airbag control device 50. The airbag control device 50 having receiving the collision signal actuates the lifting device of the engine hood and performs a deploy control of the airbag 70, to deploy the airbag 70 at the inner side or the outer side of the lifted engine hood. Thus, the impact on the human colliding with the vehicle 80 can be buffered by the deployed airbag 70.

Alternatively, the collision detection process can be also consisted to perform the output process of the human collision signal at step S119 without performing the above-described determining process at step S117.

That is, without determining whether or not the vehicle is traveling, step S119 will be performed in the case where it is determined that the detection object is the human at step S107 (that is, YES is determined at step S107) and that the impact signal is outputted at step S113 (that is, YES is determined at step S113), and that the existence direction of the human and impact direction are substantially same at step S115 (that is, YES is determined at step S115). At step S119, the impact signal is outputted to the airbag control device 50. Therefore, when a two-wheeled vehicle or the like collides with the vehicle 80 which is parked, the human in the two-wheeled vehicle or the like can be protected by the deployed airbag 70.

More alternatively, the collision detection process can be also consisted to perform the output process of the collision signal at step S119 without performing the above-described determining processes at step S115 step S117, in the case where it is determined at step S105 that the temperature of the best source is within the predetermined range.

That is, for example, even when the fixed object having the similar mass property and stiffness property to the human collides with the vehicle 80, the fixed object will not be determined to be the human based on the temperature signal at step S105 (that is, NO will be determined at step S105). Therefore, the collision between the human and the vehicle 80 can be substantially detected even without the determining processes at steps S115 and S117, in the case where it is determined that the detection object is the human based on the temperature signal at step S105 (that is, YES is determined at step S105) and that the impact signal is outputted at step S113 (that is, YES is determined at step S113). Thus, a false detection can be restricted.

Next, the effects of the collision detection device will be described.

According to this embodiment, the collision detection device 1 can be mounted to the vehicle 80, for example. In this case, the human detecting sensor 30 detects the intensity of the heat ray radiated by the detection object which is near or contacts the vehicle, outputs the first direction signal indicating the existence direction of the detection object based on the detected intensity, and detects the ultrasound wave reflected by the detection of the detection object and outputs the second direction signal indicating the existence direction of the detection object based on the detection result. Furthermore, the physical-amount sensor 27 is provided to detect the impact applied to the vehicle 80 and output the impact signal indicating that the impact is applied to the vehicle 80 based on the detection result.

Thus, in the case where it is determined that the difference between the first direction signal and the second direction signal is within the first predetermined range and the impact signal is outputted, the ECU 21 can output the collision signal indicating that there occurs the collision between the vehicle 80 and the human.

Because the direction of the detection object which radiates the heat ray and the direction of the detection object which reflects the ultrasound wave are detected by the human detecting sensor 30, the ECU 21 can determine that the detection object is the tangible object and the heat source to be the human in the case it is determined that the difference between the first direction signal and the second direction signal is within the first predetermined range.

Because it can be determined that the detection object is the intangible heat source in the case where only the first direction signal is outputted and that the detection object is an object without radiating the heat ray in the case where only the second direction signal is outputted, the human can be substantially distinguished from the object other than the human. Thus, the false detection can be restricted.

The collision signal will be outputted, in the case where the ECU 21 determines that the difference between the third direction signal and the first direction signal is within the second predetermined range and the difference between the third direction signal and the second direction signal is within the third predetermined range, that is, in the case where the direction of the impact applied to the vehicle 80 and the existence direction of the detection object are substantially same. The collision signal will not be outputted, in the case where the impact is exerted to the vehicle in the direction different from the existence direction of the detection object.

Therefore, in the case where the approaching direction (to vehicle 80) of the human is different from the direction of the impact on the vehicle by the fixed object such as the power pole, the collision signal is not outputted. Accordingly, the false detection can be restricted even in the case where the human approaches the vehicle in the different direction (from that of impact direction) simultaneously with the impact application by the fixed object.

Because the collision signal is outputted in the case where it is determined that the vehicle 80 is traveling based on the vehicle velocity signal from the vehicle velocity sensor 25, the collision signal will not be outputted in the case where the vehicle is parked, that is, in the case where the vehicle does not move. Therefore, the collision detection device can function mainly when the vehicle is traveling to easily have a traffic accident with the human. Thus, the false detection can be more practicably restricted.

In the case where it is determined that the difference between the first direction signal and the second direction signal is within the first predetermined range, the ECU 21 beforehand recognizes the existence of the human as he detection object in the sake of the output of the deployment preparing signal to the airbag deploy preparing device 51 so that the airbag deploy preparing device 51 can prepare the deployment of the airbag 70. Thus, the airbag 70 can be rapidly deployed.

The detection unit 10 can detect the intensity of the heat ray radiated from the detection object and detect the ultrasonic wave via the vibration due to the ultrasonic wave, which is reflected by the detection object and transferred to the detection unit 10.

Because the detection unit 10 is provided with the detection member 15 for detecting the ultrasound wave and the infrared, the detection unit 10 can output the first direction signal and the second direction signal. Therefore, the comparison between the different direction signals can become easy and the accuracy of the comparison can be improved. Moreover, because the single detection unit 10 can function as the ultrasonic detection portion and the infrared detection portion, the component number can be reduced. Thus, the collision detection device 1 can be small-sized.

Furthermore, because the ultrasonic wave received by the receiving member 40 can be transferred to the detection member 15 (which will vibrate due to ultrasonic wave transferred thereto) through the supporting member 11a which lifts the end portion of the detection member 15 to support it, the ultrasonic wave can be transferred as the solid vibration. Thus, the attenuation of the ultrasonic wave can be reduced, so that the ultrasonic wave can be efficiently transferred to the detection member 15.

Moreover, because the supporting member 11a is attached at the different position from that of the receiving portion 40a of the receiving member 40 in such a manner that the detection member 15 does not contact the receiving member 40, the detection member 15 can be restricted from being damaged due to contacting the receiving member 40 even when the receiving member 40 moves to the side of the detection member 15 due to the exterior force.

Because the receiving member 40 is made of the material through which the infrared can pass, the infrared can reach the detection member 15 through the receiving member 40. Therefore, it is unnecessary to additionally provide a member as a reflection member in order to transfer the infrared to the detection member 15. Thus, the collision detection device 1 can be small-sized.

According to this embodiment, the vibration detection portion 12 is constructed of the piezoelectric material having the pyroelectric property, so that the detection member 15 can be constructed to function as the ultrasonic detection portion and the infrared detection portion. Moreover, the vibration detection portion 12 has the resonance frequency which is sharp and the receiving sensitivity of the ultrasonic wave is high, so that the detection accuracy of the direction signal can be improved.

Second Embodiment

Figure 7:
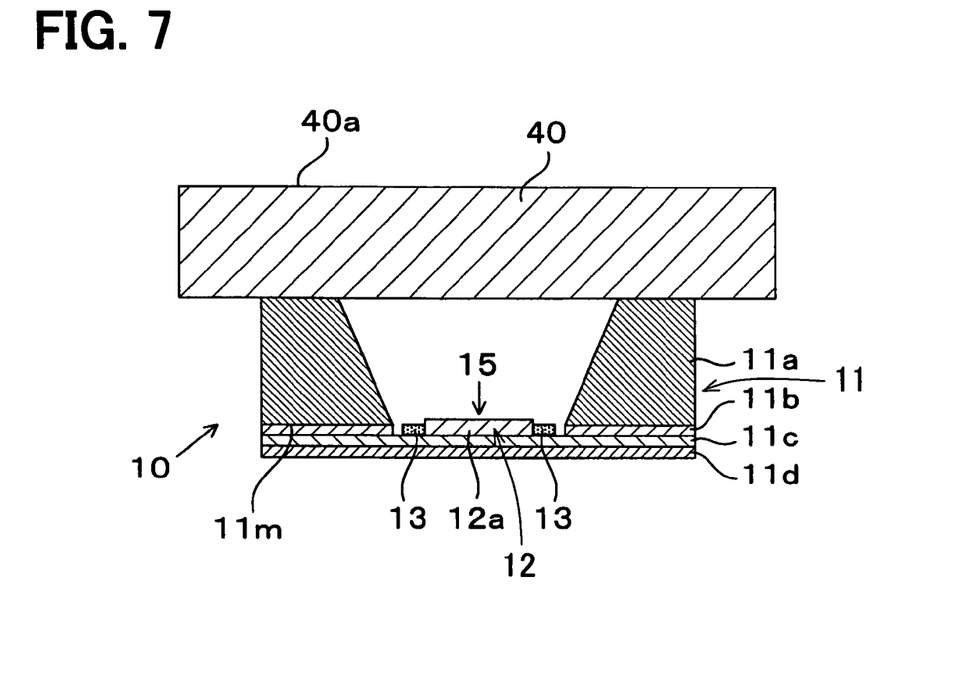
FIG. 7 is a partially sectional view showing a construction of a detection unit of a human detection sensor according to a second embodiment of the present invention.

According to a second embodiment of the present invention, as shown in FIG. 7, the vibration detection portion 12 of the human detecting sensor 30 can be arranged a different position from that of the above-described first embodiment.

In this case, the vibration detection portion 12 can be also arranged at the surface of the silicon activated layer 11c of the side of the supporting member 11a. Thus, the infrared can reach the vibration detection portion 12 without passing through the semiconductor board 11, so that the board 11 can be constructed to be opaque for the infrared. Moreover, because the attenuation of the infrared can be reduced, the sensitivity of the human detecting sensor 30 can be improved.

Third Embodiment

In the above-described embodiments, the piezoelectric type vibration detection portion 12 is provided for the detection member 15 of the detection unit 10. However, the vibration detection portion 12 is not limited to the piezoelectric type vibration detection member.

Figure 8A:
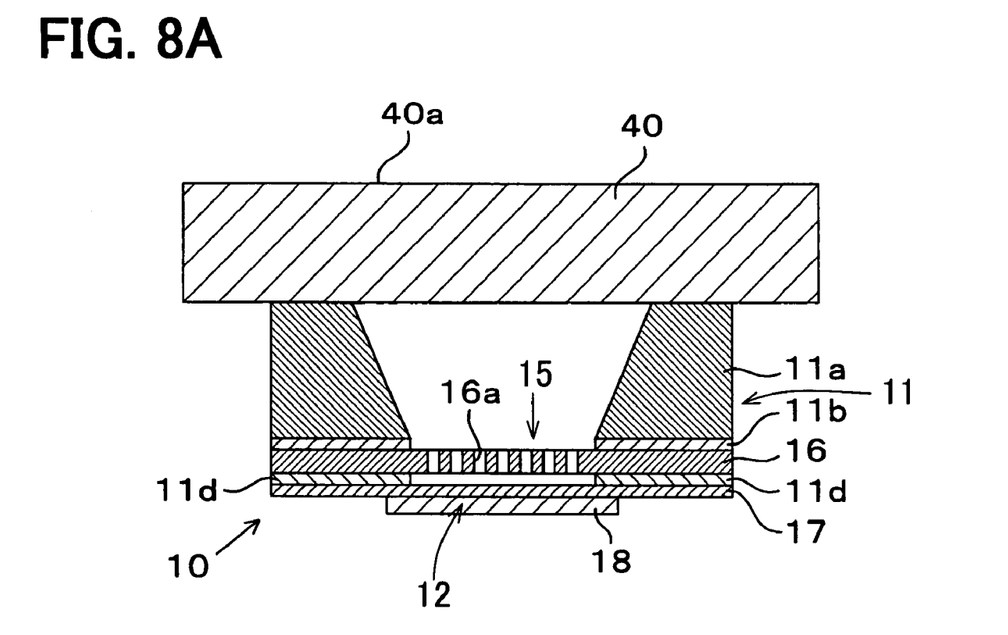
FIG. 8A is a partially sectional view showing a construction of a detection unit of a human detection sensor according to a third embodiment of the present invention.

For example, according to a second embodiment of the present invention, the vibration detection portion 12 of a capacity type can be used. The vibration detection member has an infrared absorption film 18 (infrared induction film) at the vibration surface, and detects the ultrasonic wave by a capacity variation between electrodes 16 and 17. Because the vibration detection portion 12 of the capacity type has a resonance frequency which is broad, the permissible range of the deviation of the detection unit 10 can be increased. Therefore, the yield can be enhanced.

As shown in FIG. 8A, the capacity type vibration detection portion 12 has the first electrode 16 which is formed at the first insulation film 11b, and the second electrode 17 made of a material through which the infrared can pass. The second electrode 17 faces the first electrode 16 to have a predetermined gap therebetween.

The infrared induction film 18 which senses the infrared and outputs a voltage signal is arranged at the surface of the second electrode 17. In this case, the infrared induction film 18 can be constructed of, for example, carbon, a graphite, a Au-black film, a Pt-black film, sion or the like. The first electrode 16 has a through hole 16a which is provided to restrict the influence of the damping of air due to the vibration.

In this case, the ultrasonic-wave transferring path is similar to the piezoelectric type vibration detection portion 12. When the capacity type vibration detection portion 12 receives the ultrasonic wave to vibrate, the gap between the first electrode 16 and the second electrode 17 varies so that the capacity of the condenser constructed of the first electrode 16 and the second electrode 17 varies. Thus, the ultrasonic wave can be detected. Moreover, the infrared passes through the through hole 16a of the first electrode 16 and transmits the second electrode 17, to reach the infrared induction film 18. Thus, the infrared can be detected.

Figure 8B:
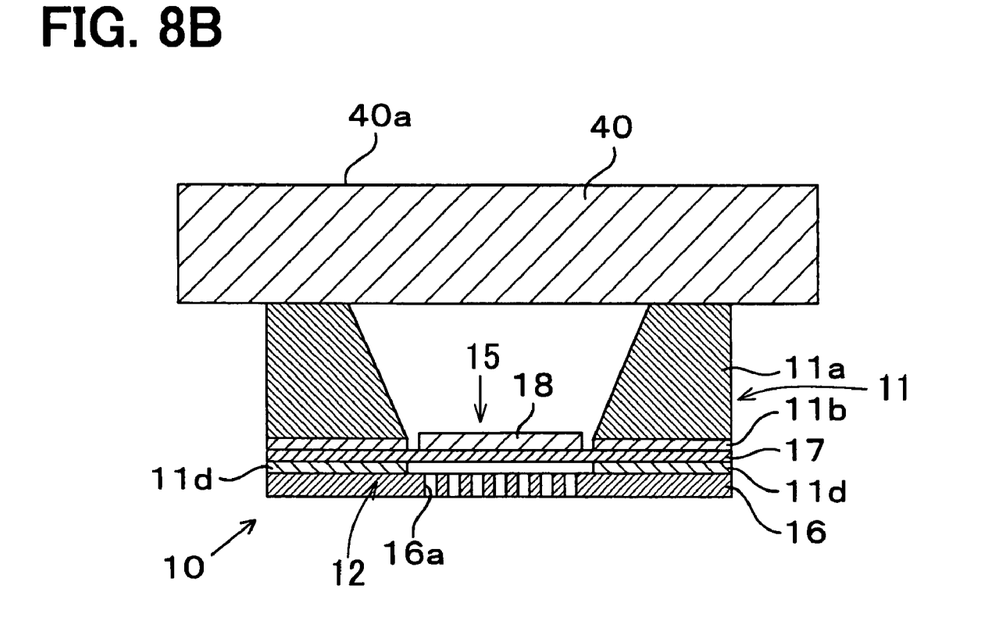
FIG. 8B is a partially sectional view showing a construction of a detection unit of a human detection sensor according to a modification of the third embodiment.

Alternatively, as shown in FIG. 8B, the arrangement position of the first electrode 16 and that of the second electrode 17 can be also interchanged with respect to what shown in FIG. 8A. In this case, the infrared induction film 18 can be arranged at the vibration surface of the second electrode 17 of the side of the supporting member 11a. Thus, the infrared can be transferred to the infrared induction film 18 without passing through the second electrode 17, so that the attenuation of the infrared can be reduced.

Fourth Embodiment

Figure 9:
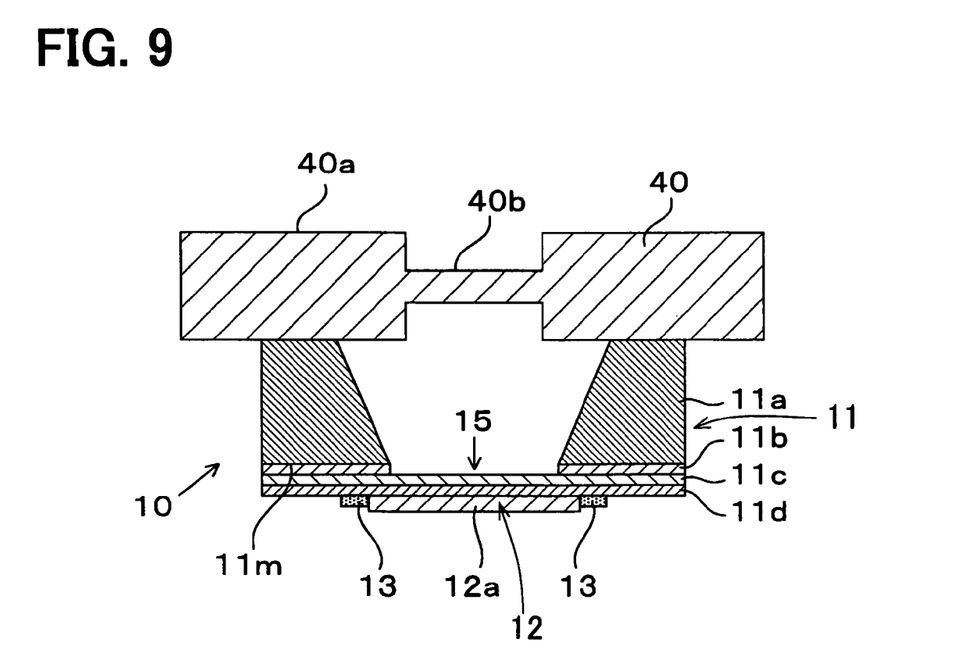
FIG. 9 is a partially sectional view showing a construction of a receiving member of a human detection sensor according to a fourth embodiment of the present invention.

According to a fourth embodiment of the present invention, at least a part of the receiving member 40 which faces the detection member 15 is constructed in such a manner that the infrared can pass through the part of the receiving member 40 more easily than the other part of the receiving member 40.

For example, as shown in FIG. 9, the receiving member 40 can be provided with a transmittance portion 40b which faces the detection member 15. The transmittance portion 40b is thinner than the other part of the receiving member 40, so that the infrared can readily pass through the transmittance portion 40b.

Alternatively, the transmittance portion 40b can be also constructed of a material through which the infrared more easily passed than the material of the other part of the receiving member 40. In this case, the transmittance portion 40b is inserted in a through hole arranged at the receiving member 40. The transmittance portion 40b is positioned to face the detection member 15.

Thus, the degree of the infrared attenuation due to the absorption and the like by the receiving member 40 before the infrared reaches the detection member 15 can be reduced, so that the sensitivity of the detection unit 10 can be improved.

Fifth Embodiment

Figure 10:
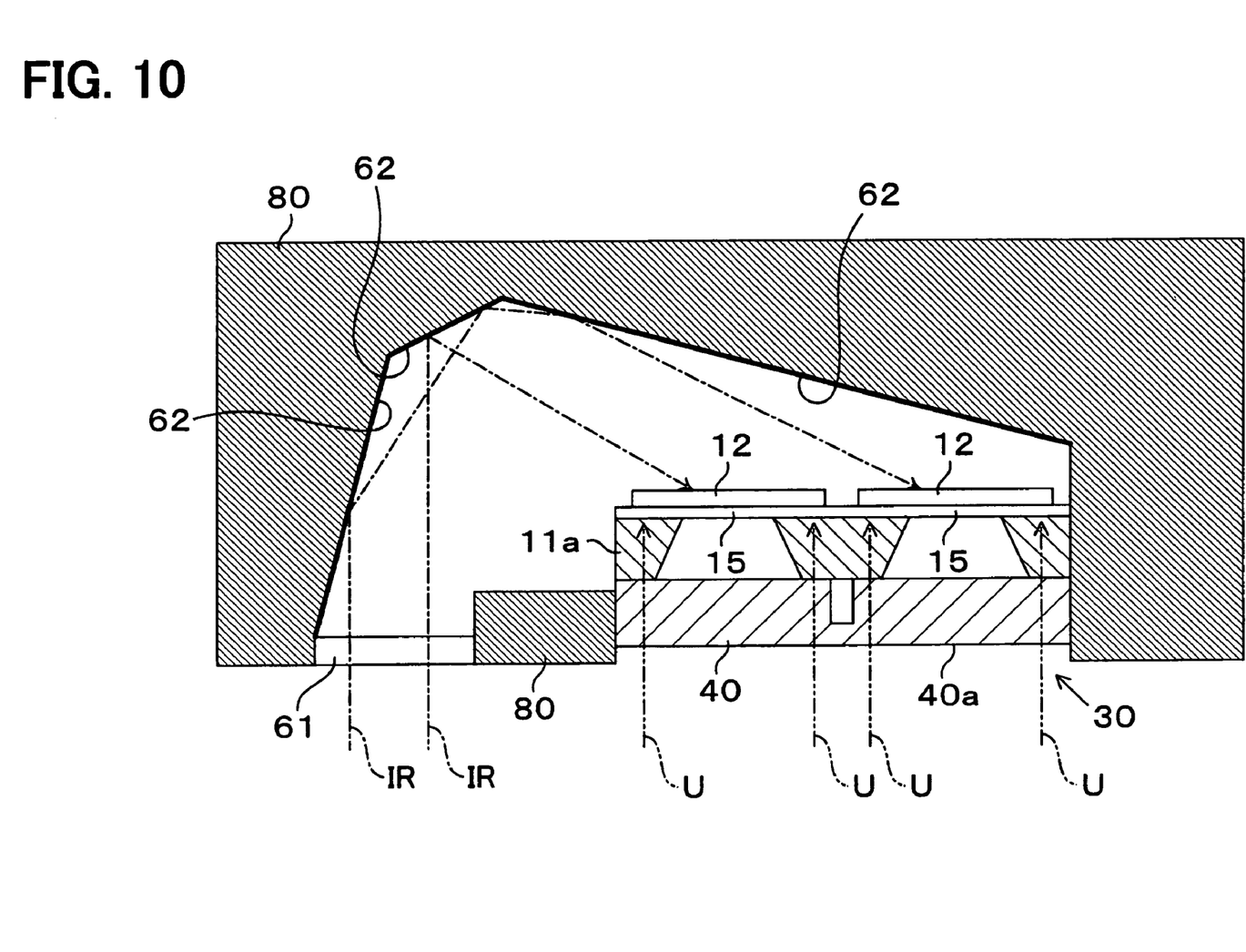
FIG. 10 is a partially sectional view showing a construction of a human detection sensor where infrared is irradiated to a detection unit of the human detection sensor according to a fifth embodiment of the present invention.

According to a fifth embodiment of the present invention, with reference to FIG. 10, a reflection member 62 for reflecting the infrared IR can be arranged in the vehicle 80 and positioned adjacent to the receiving member 40. In this case, the vehicle 80 is provided with an introduction path through which the infrared IR is introduced to the receiving member 40.

The vehicle 80 has an opening which is arranged at the introduction path and blocked by a glass member 61. In this case, the infrared IR which is reflected by the reflection member 62 irradiates the detection member 15 from the inner side of the vehicle 80.

Thus, even in the case where the human detecting sensor 30 is directly attached to the back side of the bumper of the vehicle 80 or in the case where the receiving member 40 is made of a metal to be opaque with respect to the infrared, the ultrasonic wave U can be transferred to the detection member 15 via the receiving member 40 and the infrared IR can be introduced to the detection member 15 by the reflection member 62.

Other Embodiment

Although the present invention has been fully described in connection with the preferred embodiments thereof with reference to the accompanying drawings, it is to be noted that various changes and modifications will become apparent to those skilled in the art.

For example, the human detecting sensor 30, and the physical-amount sensor 27 of the collision detection device 1 can be attached to a rear bumper 85 (with reference to FIG. 1A) which is positioned at the rear portion of the vehicle 80. Thus, similar to the airbag system arranged at the front portion of the vehicle 80, the airbag 70 arranged at the rear portion of the vehicle 80 can be deployed in the case where there occurs a collision between the vehicle 80 and a human when the vehicle 80 is backed. Thus, an impact on the human due to the collision with the vehicle 80 can be buffered when the vehicle 80 is backed.

Moreover, in the above-described embodiments, the detection unit 10 has the detection member 15 for detecting the ultrasonic wave and the infrared. However, the detection unit 10 can be also provided with an ultrasonic sensor for detecting the ultrasonic wave reflected by the detection object, and an infrared sensor for detecting the intensity of the heat ray radiated by the detection object. That is, the ultrasonic sensor and the infrared sensor are constructed separately from each other. For example, the ultrasonic sensor can be arranged at the front bumper 84 (shown in FIG. 2A) of the vehicle 80. The infrared sensor can be arranged at the back side of the back mirror 86 (shown in FIG. 2B).

Thus, there is no obstructer (except windshield) which obstructs the transferring of the infrared to the back side of the back mirror 86 from the front side of the vehicle 80. Therefore, the false detection can be restricted.

Such changes and modifications are to be understood as being in the scope of the present invention as defined by the appended claims.

What is claimed is:
1. A collision detection device for a vehicle, comprising:
a first direction signal outputting unit for detecting an intensity of heat ray radiated from a detection object which is near or contacts the vehicle and outputting a first direction signal corresponding to an existence direction of the detection object based on the detected intensity;
a sending member which is mounted to the vehicle to send an ultrasonic wave;
a second direction signal outputting unit for detecting an ultrasound wave which is sent by the sending member and reflected by a detection object and outputting a second direction signal corresponding to an existence direction of the detection object based on a detection result about the ultrasonic wave;
an impact signal outputting unit for detecting an impact on the vehicle and outputting an impact signal which indicates that the impact is applied to the vehicle based on a detection result about the impact; and
a control unit which determines that there occurs a collision between the vehicle and a human in the case where the control unit determines that a difference between the first direction signal and the second direction signal is within a first predetermined range and the impact signal is outputted.

2. The collision detection device according to claim 1, wherein
the control unit outputs a collision signal when it is determined that there occurs the collision between the vehicle and the human.

3. The collision detection device according to claim 2, wherein:
the impact signal outputting unit further outputs a third direction signal indicating a direction of the impact applied to the vehicle based on the detecting result about the impact on the vehicle; and
the control unit outputs the collision signal in the case where the control unit determines that a difference between the third direction signal and the first direction signal is within a second predetermined range and a difference between the third direction signal and the second direction signal is within a third predetermined range.

4. The collision detection device according to claim 2, further comprising
a velocity signal outputting unit for detecting a velocity of the vehicle and outing a velocity signal corresponding thereto, wherein
the control unit outputs the collision signal further when it is determined that the vehicle is traveling based on the velocity signal.

5. The collision detection device according to claim 1, wherein:
the vehicle has an airbag for buffering an impact on the human in the collision with the vehicle, and an airbag deployment preparing unit which prepares a deployment of the airbag when a deployment preparing signal is inputted thereto; and
the control unit outputs the deployment preparing signal to the airbag deployment preparing unit, in the case where the control unit determines that the difference between the first direction signal and the second direction signal is within the first predetermined range.

6. The collision detection device according to claim 1, wherein:
the first direction signal outputting unit and the second direction signal outputting unit are constructed of a single unit which includes a receiving member, a detection member and a supporting member;
the receiving member has a receiving portion for receiving the ultrasonic wave reflected by the detection object, and is mounted to the vehicle in such a manner that the receiving portion is exposed to an outer side of the vehicle;

the detection member detects the intensity of the heat ray radiated by the detection object and vibrates due to the reflected ultrasonic wave transferred thereto to detect the ultrasonic wave, an end portion of the detection member being lifted by the supporting member to be sustained;

the supporting member is attached to the receiving member at a different position from that of the receiving portion in such a manner that the detection member non-contacts the receiving portion; and the ultrasonic wave received by the receiving member is transferable to the detection member through the supporting member.

7. The collision detection device according to claim 6, wherein the receiving portion is constructed of a material through which infrared is capable of passing.

8. The collision detection device according to claim 7, wherein at least a part of the receiving portion which faces the detection member is constructed in such a manner that the infrared passes through the part of the receiving portion more easily than an other part thereof.

9. The collision detection device according to claim 6, wherein the detection member has a piezoelectric type vibration detection portion which is made of a piezoelectric material having a pyroelectric property.

10. The collision detection device according to claim 6, wherein the detection member has a capacity type vibration detection portion including an infrared absorption film which is positioned at a vibration surface of the vibration detection portion to detect infrared.

11. The collision detection device according to claim 1, wherein at least one of a front portion and a rear portion of the vehicle is provided with the first direction signal outputting unit and the second direction signal outputting unit.

12. The collision detection device according to claim 1, wherein:

the impact signal outputting unit is constructed of one of an acceleration sensor, a displacement sensor, and a pressure sensor; and at least one of a front portion and a rear portion of the vehicle is provided with the impact signal outputting unit.

13. The collision detection device according to claim 2, wherein the collision signal from the control unit is inputted to an airbag control device of the vehicle, so that an airbag of the vehicle is deployed to protect the human.

* * * * *